(12) United States Patent
Alcazar et al.

(10) Patent No.: US 7,543,238 B2
(45) Date of Patent: Jun. 2, 2009

(54) SYSTEM AND METHOD FOR DIRECTLY ACCESSING FUNCTIONALITY PROVIDED BY AN APPLICATION

(75) Inventors: Mark A. Alcazar, Seattle, WA (US); Margaret L. Goodwin, Lynnwood, WA (US); Kusuma P. Vellanki, Hillsboro, OR (US)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 10/348,677

(22) Filed: Jan. 21, 2003

(65) Prior Publication Data

US 2004/0141013 A1 Jul. 22, 2004

(51) Int. Cl.
- G06F 3/00 (2006.01)
- G06F 9/00 (2006.01)
- G06F 17/00 (2006.01)

(52) U.S. Cl. ............ 715/762; 715/760; 715/763; 717/120; 717/165; 717/104; 717/106

(58) Field of Classification Search ........ 715/762, 715/760, 513, 763, 764, 234, 239; 717/120, 717/165, 104, 106
See application file for complete search history.

(56) References Cited

U.S. PATENT DOCUMENTS

| 5,287,548 | A * | 2/1994 | Flood et al. ............ 700/18 |
| 6,173,316 | B1 * | 1/2001 | De Boor et al. .......... 709/218 |
| 6,788,313 | B1 * | 9/2004 | Heil .................. 715/705 |
| 7,039,871 | B2 * | 5/2006 | Cronk ................. 715/741 |
| 2002/0005867 | A1 * | 1/2002 | Gvily ................. 345/760 |
| 2003/0061279 | A1 * | 3/2003 | Llewellyn et al. ........ 709/203 |
| 2003/0132961 | A1 * | 7/2003 | Aarts et al. ............ 345/760 |
| 2003/0146937 | A1 * | 8/2003 | Lee .................. 345/781 |
| 2003/0227491 | A1 * | 12/2003 | Moehrle ............... 345/854 |
| 2004/0205575 | A1 * | 10/2004 | Wattenberg ............. 715/513 |

OTHER PUBLICATIONS

Martyn, Mathieu Kennedy, Computing Device with Improved User Interface for Applications, Feb. 7, 2002, WO 02/10893.*
Bonner, Paul, "Give Your Apps the Smarts They Need", Windows Sources, vol. 4, No. 5, May 1, 1996, p. 82(1).
Eckhardt, Robert C., "OneClick 1.0.1", MacWorld, vol. 13, No. 5, May 1, 1996, p. 67.
Somerson, Paul, "Task Masters", PC Computing, vol. 8, No. 4, Apr. 1995, p. 43.
Alan Zisman, "Using Netscape Composer to build web pages," Internet article, http://web.archive.org/web/20020620203712/http://zisman.ca/composer, Jun. 20, 2002, 9 pgs.

(Continued)

*Primary Examiner*—Tadesse Hailu
*Assistant Examiner*—Anita D Chaudhuri
(74) *Attorney, Agent, or Firm*—Merchant & Gould PC

(57) ABSTRACT

Described is a system and method for directly accessing functionality provided by an application, such as via the Web or an operating system Shell. The functionality of an application is separated into unique tasks. Each task has an associated entry point into the application. The associated entry point allows a computer user to invoke the specified task directly rather than to invoke the application and then navigate within the application to locate the specified task. Each task may be exposed to an operating system, such as by having an icon associated with the task appear in an activity center on the desktop. The present invention may operate within a desktop environment, a web-based environment, a browser environment, and others.

27 Claims, 8 Drawing Sheets

OTHER PUBLICATIONS

Preston Brown et al., "Desktop Entry Standard," Internet Article, http://web.archive.org/web/20010501234042/http://www.freedesktop.org/standards/desktop-entry-spec/desktop-entry-spec.html, Mar. 6, 2001, 7 pgs.

Gailly, "Manpage of GZIP," Internet Article, www.linuxinfor.com/german/man1/gzip.html, Jul. 1, 1993, 2 pgs.

Thurrot, "Activity Centers Preview," Internet Article, www.winsupersite.com/showcase/ac_preview.asp, May 4, 2000, 10 pgs.

Anonymous, "Communicator's Command Line Options", Internet Article, http://grox.net/doc/netscape/netscape-command-line.html, 1999, retrieved Nov. 2, 2006, 4 pgs.

* cited by examiner

```
<Application.TaskList>
 <TaskList>
  <TaskInfo>
      Id="Balance Checkbook"
      Uri="object://MyApplications/MoneyManager.BalanceCheckbook"
      FriendlyName = "Balance Checkbook"
      ToolTip = "Click here to balance your checkbook"
      Icon = "BalanceCheckbook.ico"
      AssemblyName = "MyCheckbook"
      ClassName = "MoneyManager.BalanceCheckbook"
      StartPage = "http://MoneyManager/BalanceCheckbook"
  </TaskInfo>

<TaskInfo>
      Id="Enter Transactions"
      Uri="object://MyApplications/MoneyManager.EnterTransactions"
      FriendlyName = "Enter Transactions"
      ToolTip = "Click here to enter transactions in your checkbook"
      Icon = "EnterTransactions.ico"
      AssemblyName = "MyTransactions"
      ClassName = "MoneyManager.EnterTransactions"
      StartPage = "http://MoneyManager/EnterTransactions"
  </TaskInfo>

<TaskInfo>
      Id="Manage401K"
      Uri="object://MyApplications/MoneyManager.Manage401K"
      FriendlyName = "Manage Retirement Account"
      ToolTip = "Click here to manage your retirement account"
      Icon = "Manage401K.ico"
      AssemblyName = "Manage401K"
      ClassName = "MoneyManager.Manage401K"
      StartPage = "http://MoneyManager/Manage401K"
  </TaskInfo>

.
      .
      .

</TaskList>
</Application.TaskList>
```

*Fig. 6*

```
<Tasks xmlns:sql="xml-sql">
    <categoryMembership name = shell.tasks">
```

700

704
```
<task
    Name = "Balance Checkbook"
    DisplayName = "Balance Checkbook"
    Icon = "BalanceCheckbook.ico">

<entryPoint name="Balance Checkbook" />
</task>
```
720

706
```
<task
    Name = "Enter Transactions"
    DisplayName = "Enter Transactions"
    Icon = "EnterTransactions.ico">

<entryPoint name="Enter Transactions" />
</task>
```

708
```
<task
    Name = "Manage Retirement Account"
    DisplayName = "Manage Retirement Account"
    Icon = "Manage401K.ico">

<entryPoint name="Manage Retirement Account"/>
</task>
```

710
```
<entryPoints>
    .
    .
    .
```

712
```
    <entryPoint
        Name = "Balance Checkbook"
        uri="object://MyApplications/MoneyManager.BalanceCheckbook"
        assembly="MoneyManager"
        class="MoneyManager.BalanceCheckbook" />
```

```
    .
    .
    .
</entryPoints>
    </categoryMembership>
</Tasks>
```

*Fig. 7*

SYSTEM AND METHOD FOR DIRECTLY ACCESSING FUNCTIONALITY PROVIDED BY AN APPLICATION

BACKGROUND OF THE INVENTION

There are a variety of software applications. Each application is designed to provide one or more related functions. For example, a personal finance management application typically provides functions for balancing a checkbook, managing a retirement account, entering transactions, purchasing stock, and the like. When a user desires to perform a specific function, the user invokes the application that provides the specific function. Typically, the application is invoked by clicking an icon on the display that is associated with the application or selecting the application from a menu. The user then selects the specific function from within the application (e.g., through a menu). While this approach may work for users that are familiar with the functions provided by each application, it is not particularly convenient. A beginning computer user is even further inconvenienced because a beginning computer user may not be familiar with the functions provided by each application Therefore, in order for the beginning computer user to perform the specific function, the beginning computer user must first determine the application that provides the specific function. This determination may involve invoking several applications and "clicking around", asking a more experienced computer user, or consulting computer books or manuals regarding the specific function that is desired. Once the beginning computer user has identified the application that provides the specific function, the beginning computer user may then invoke the application, but may still require assistance to find and select the specific function in the same manner as the experienced computer user. While these solutions allow users to access any desired function provided by any application, the solutions are not ideal.

SUMMARY OF THE INVENTION

The present invention is directed at a system and method for directly accessing functionality provided by an application. The invention provides a mechanism for developers to control the points at which users can navigate into applications that they have designed. The applications provide one or more high level units of functionality (i.e., tasks). Therefore, each application has one or more tasks associated with it. For example, a personal finance management application may have several tasks, such as balance checkbook, manage a retirement account, enter transactions, purchase stock, and the like, associated with it.

In accordance with the present invention, each task has an associated entry point into the application. The entry point allows a computer user to invoke the specified task directly without having to navigate within the application to locate the task. Each task may be exposed to the user from the operating system shell. When the task is exposed through the operating system shell, a name associated with the task may be easily searched by users, accessibility software can more easily identify the capabilities (i.e., tasks) of an application for impaired users using the name associated with the task, users may more readily discern the capabilities of the software that they have purchased by viewing the names associated with the various tasks, and the like.

The present invention may operate within a traditional desktop environment, a traditional web-based environment, a browser environment that hosts navigation centric applications, and others. When operating within a browser environment, multiple related pages may be associated with a single task. Then, when a page is saved (hereinafter referred to as "favoritized"), the uniform resource locator (URL) of the page designated as the entry point for the task that is associated with the favoritized page is saved, rather than the URL of the favoritized page itself. This allows developers to control the points at which users can navigate into the navigation based application that they have designed.

Thus, even an experienced computer user, who already knows what application to launch and how to find the functionality within the application, may benefit from the more efficient and convenient mechanism provided by the present invention, which allows them to access the functionality directly from the desktop.

BRIEF DESCRIPTION OF THE DRAWINGS

FIG. 6 is one embodiment of a format for declaratively describing the tasks in an application that is suitable for use in FIG. 5.

FIG. 7 is one embodiment of a task manifest that is suitable for use in FIG. 5.

DETAILED DESCRIPTION OF THE PREFERRED EMBODIMENT

The present invention is directed at a system and method for directly accessing functionality provided by an application. The functionality is separated into unique tasks. Therefore, each application has one or more associated tasks. Each task represents a user-centric activity that helps a user accomplish a concrete activity. For example, a personal finance management application may have several tasks, such as a balance checkbook task, a manage 401K task, an enter transactions task, a purchase stock task, and the like. In accordance with the present invention, an entry point into the application is defined for each task. When the entry point is invoked, the flow of execution within the application is directed to a portion of code associated with the task.

Thus, the present invention provides a mechanism that allows a computer user to invoke the specified task directly rather than to navigate within the application to locate the specified task. Each task may be exposed to the user directly from the operating system shell, such as by having an icon associated with the task appear in an activity center. The present invention may operate within a desktop environment, a web-based environment, a browser environment that hosts navigation centric applications, and others. For the following discussion, the browser environment is used to describe the invention. For this embodiment, the term application refers to a navigation centric application that is hosted in the browser environment. Those skilled in the art, after reading the description below, will be able to implement the present invention in other environments.

Figure 1:
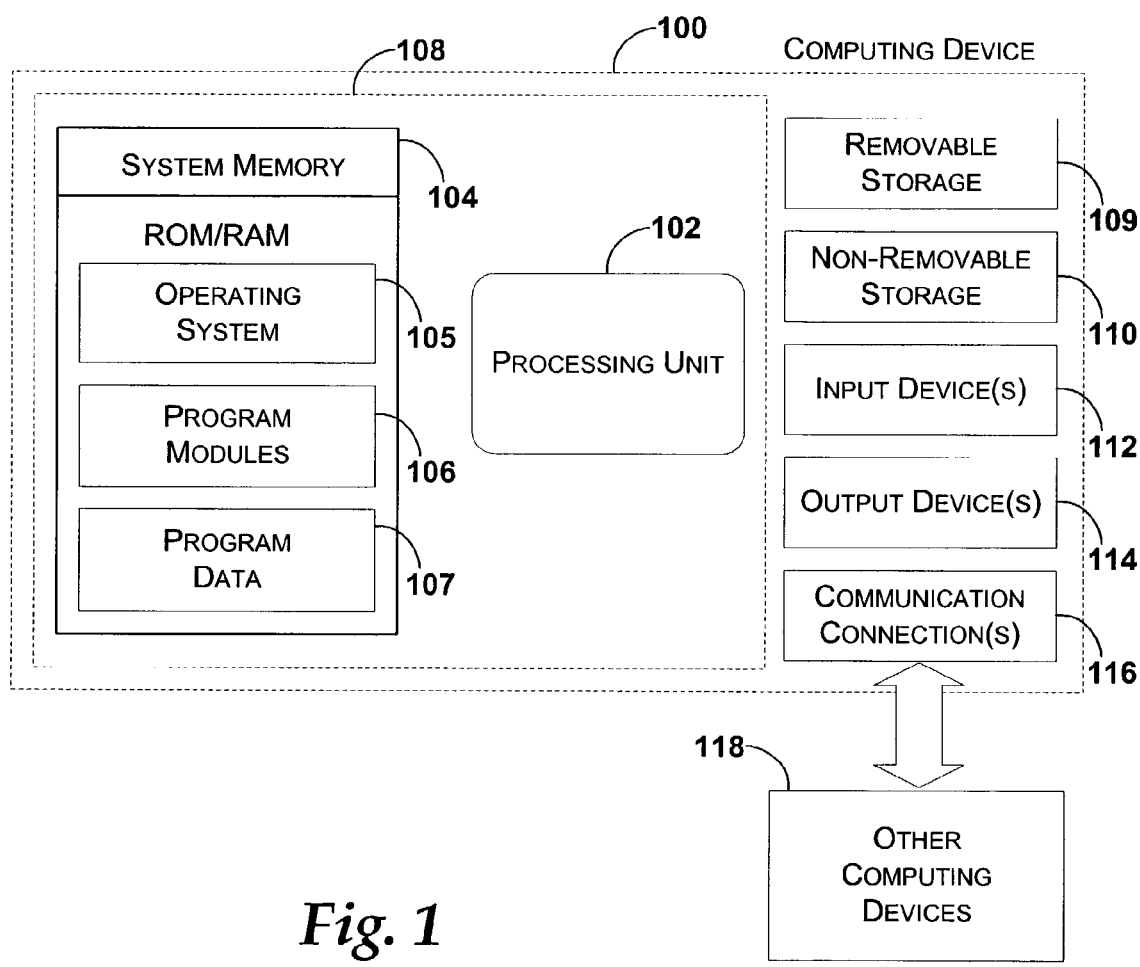
FIG. 1 illustrates an exemplary computing device that may be used in one exemplary embodiment of the present invention.

FIG. 1 illustrates an exemplary computing device that may be used in one exemplary embodiment of the present invention. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, a word processor, and the like. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
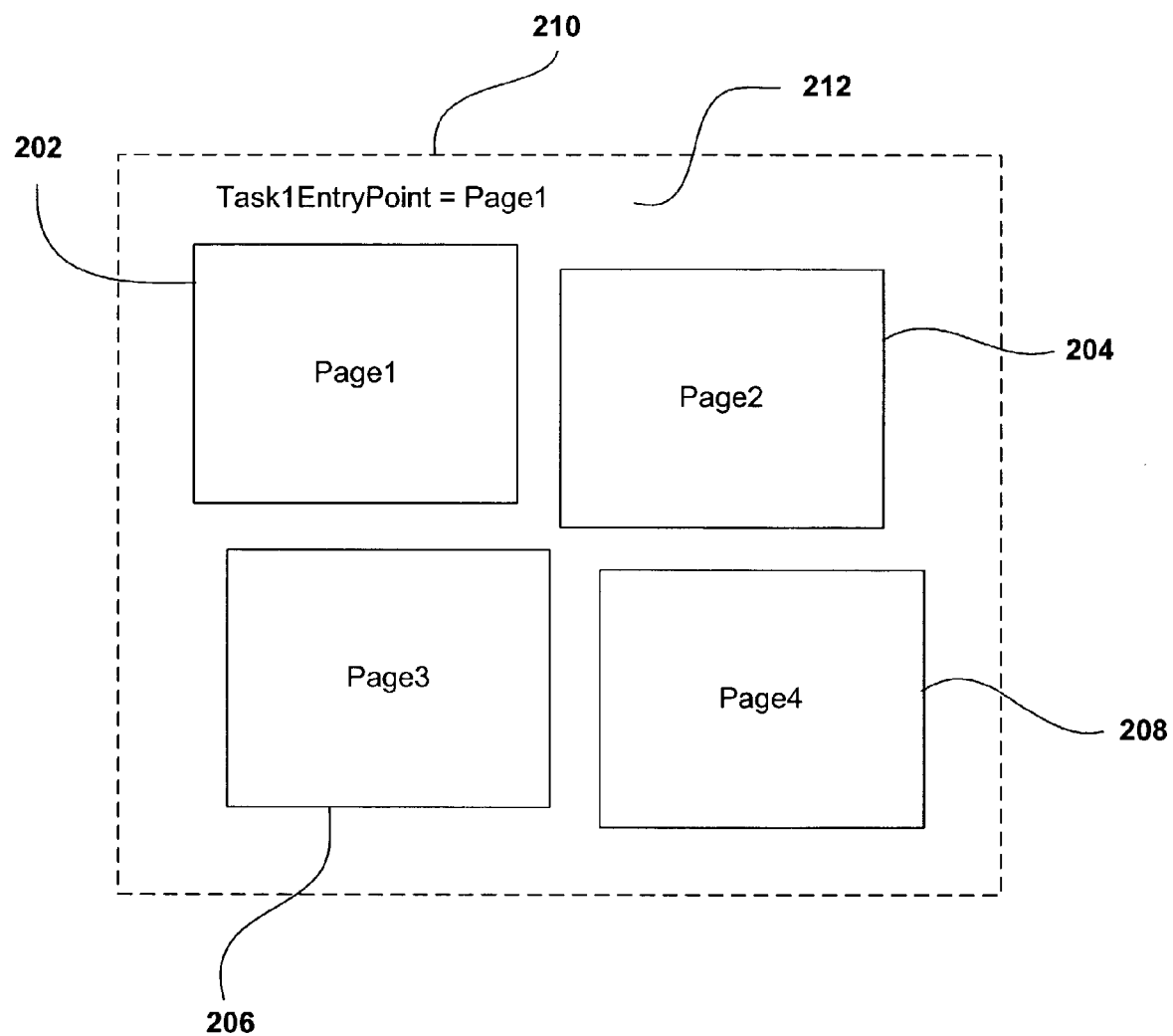
FIG. 2 is a graphical representation of a task that associates multiple pages for one of the units of functionality provided by an application hosted in a browser.
Figure 8:
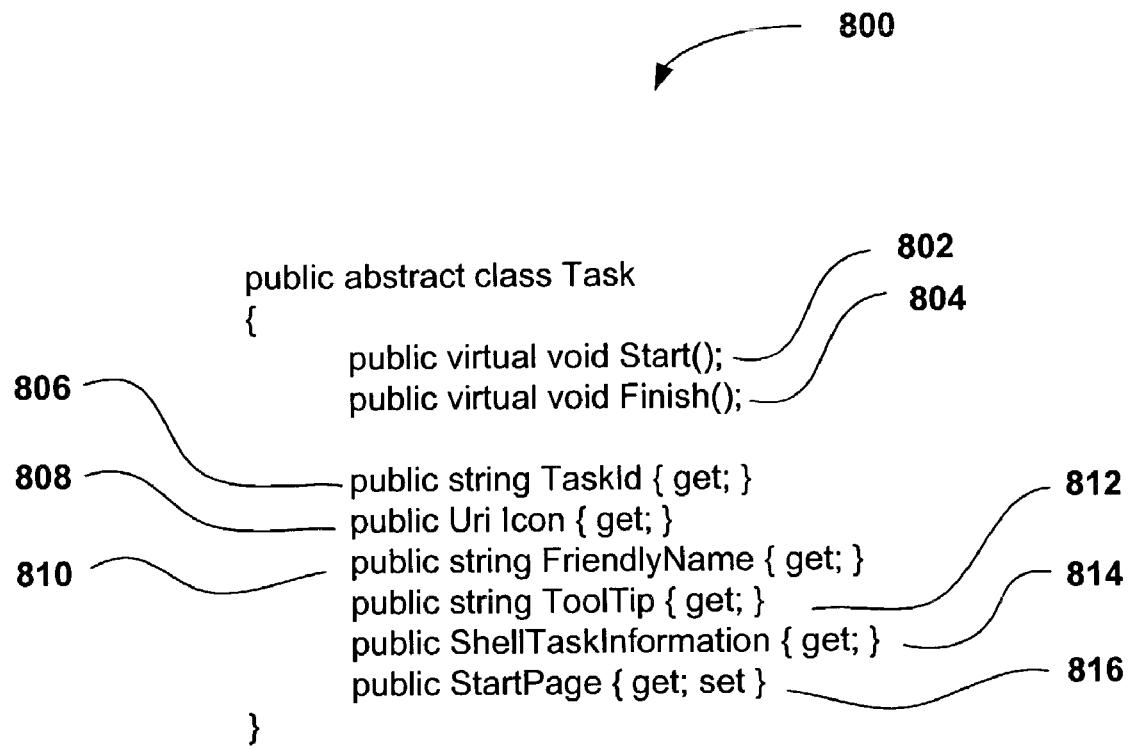
FIG. 8 is one embodiment of a task class that is suitable for use in FIG. 5.

FIG. 2 is a graphical representation of a task defined for a navigation based application (not shown). The task associates several pages together. The several pages work in conjunction with each other to perform one of the units of functionality provided by the navigation based application. For this embodiment, the navigation based application is hosted in a browser. Each task may be associated with several pages (e.g., pages 202-208). The task is illustrated in FIG. 2 by those pages within dashed line 210. Hereinafter, these pages are collectively referred to as task 210. Briefly, described later in detail in conjunction with FIGS. 5-8, each task 210 is assigned an entry point. In one embodiment, the entry point may be an entry page. For this embodiment, another embodiment for task 210 may be used that includes an attribute for specifying the entry page. Throughout the following discussion, navigationTask may used to refer to this embodiment. The navigationTask is illustrated in FIG. 8 and described in conjunction therewith.

In FIG. 2, an entry point designation 212 is used to designate one of the pages that has been grouped together to form the task 210 as the entry point. In the above example, page 202 (i.e., "Page1") has been designated in the entry point designation 212 as the entry point for task 210. Pages 202-208 may represent HTML pages, XML documents, a collection of UI controls, and the like.

Figure 3:
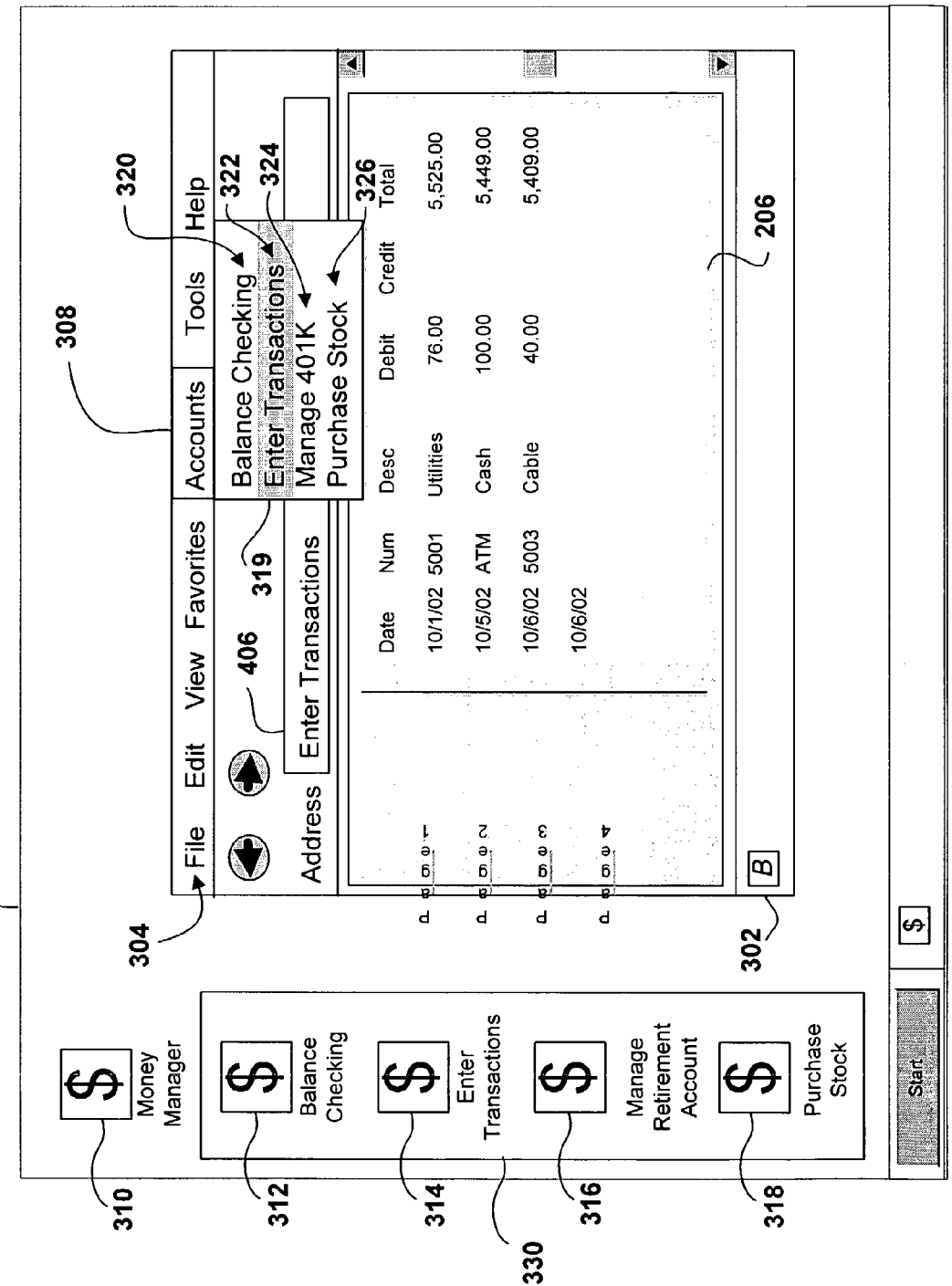
FIGS. 3 and 4 are displays that illustrate an exemplary environment in which a browser displays one of the pages associated with the task shown in FIG. 2 and displays several exposed task entry points associated with the units of functionality provided by the application.

FIG. 3 is a display that illustrates an exemplary environment in which a browser displays one of the pages associated with the task shown in FIG. 2 and displays several exposed task entry points associated with the units of functionality provided by the application. As mentioned above, the exemplary environment is a browser environment which hosts navigation-centric applications. For the following discussion, the exemplary application is a finance management application and terminology associated with the finance management application is used throughout the specification to describe the invention. However, one will appreciate that the present invention is applicable to any type of application. Referring to FIG. 3, display 300 includes a desktop 301 on which a window 302 is displayed. Window 302 is for an application (e.g., a finance management application) that has been invoked. Typically, the application provides a menu bar 304 for traversing the options provided by the application. Traditionally, the options provided the mechanism for accessing the units of functionality provided by the application. For example, menu bar 304 includes several menu items (e.g., Accounts menu item 308). Each of these menu items may provide a sub-menu (e.g., sub-menu 319) with sub-menu items (e.g., Enter Transactions sub-menu item 322).

In the present invention, the functionality associated with the Enter Transactions sub-menu item 322 is directly accessible using a task. Briefly, the task is associated with a task entry point (e.g., Enter Transactions task entry point 314) that provides the direct accessibility to the functionality associated with the Enter Transactions sub-menu item 322. In the embodiment illustrated, the exposed task entry points (e.g., balance checking exposed entry point 312, enter transactions task entry point 314, manage retirement account exposed entry point 316, and purchase stock exposed entry point 318) are displayed as icons in an activity center 330 on the desktop 301 of display 300. The activity center 330 is organized based on the type of activity provided. For example, the exposed entry points 312-318 may be in a Finance activity center. Because the exposed entry points 312-318 are organized in activity centers, users may more readily find their desired task. As one skilled in the art will appreciate, the exposed entry points may take various forms, such as a menu item in the Start menu, and the like without departing from the scope of the present invention.

Desktop 301 also displays another entry point, main application entry point 310. The main application entry point 310 is the traditional entry point into the application and will, typically, not be included as one of the tasks. In FIG. 3, main application entry point 310 is displayed as a shortcut on desktop 301. In the past, each application had the one entry point (e.g., main application entry point 310) that was selected to invoke the application. When the main application entry point 310 was selected, the associated application was instantiated in window 302 and the application provided menu bar 304 for navigation within the application window 302. Then, the functionality provided by the application was chosen by navigating through the menus provided by the application. Thus, in the past, a beginning computer user may have needed to invoke several applications and pull-down several menus in each application in order to locate a menu-item that appeared to be associated with the desired task.

In contrast, the present invention provides a mechanism for easily identifying the functionalities provided by all the applications available to a user. The mechanism provides a means for associating a task entry point to each of the units of functionality provided by the application. This mechanism allows users to directly access the desired functionality without having to navigate within the application using menus. As shown, in one embodiment, the exposed task entry points are organized by categories into activity centers 330. As will be described in detail later, invoking a task entry point directs execution to the specific code within the application that implements the selected functionality.

In another embodiment, tasks may be exposed through the Shell via a natural language search engine. In this embodiment, a user may type a text string that describes the functionality that they want to perform. The text string is input on a search bar associated with the natural language search engine. Based on the text string, the natural language search engine performs a search to identify available tasks associated with the text string. The search may search all registered tasks in the task store. The results from the search may then be displayed as shortcuts having an icon, a name of the task, and an associated tooltip. The displayed shortcuts then represent the tasks on the machine that can perform the functionality requested by the user. The user may then conveniently select one of the displayed shortcuts to directly access the requested functionality.

The tasks of the present invention may perform any type of functionality, such as write letters, pay bills, arrange photographs, compose an email, and the like. Using the mechanism of the present invention allows computer users to more easily find a specific task, allows accessibility software the ability to more easily identify the capabilities (i.e., tasks) provided by each application, and the like.

Figure 4:
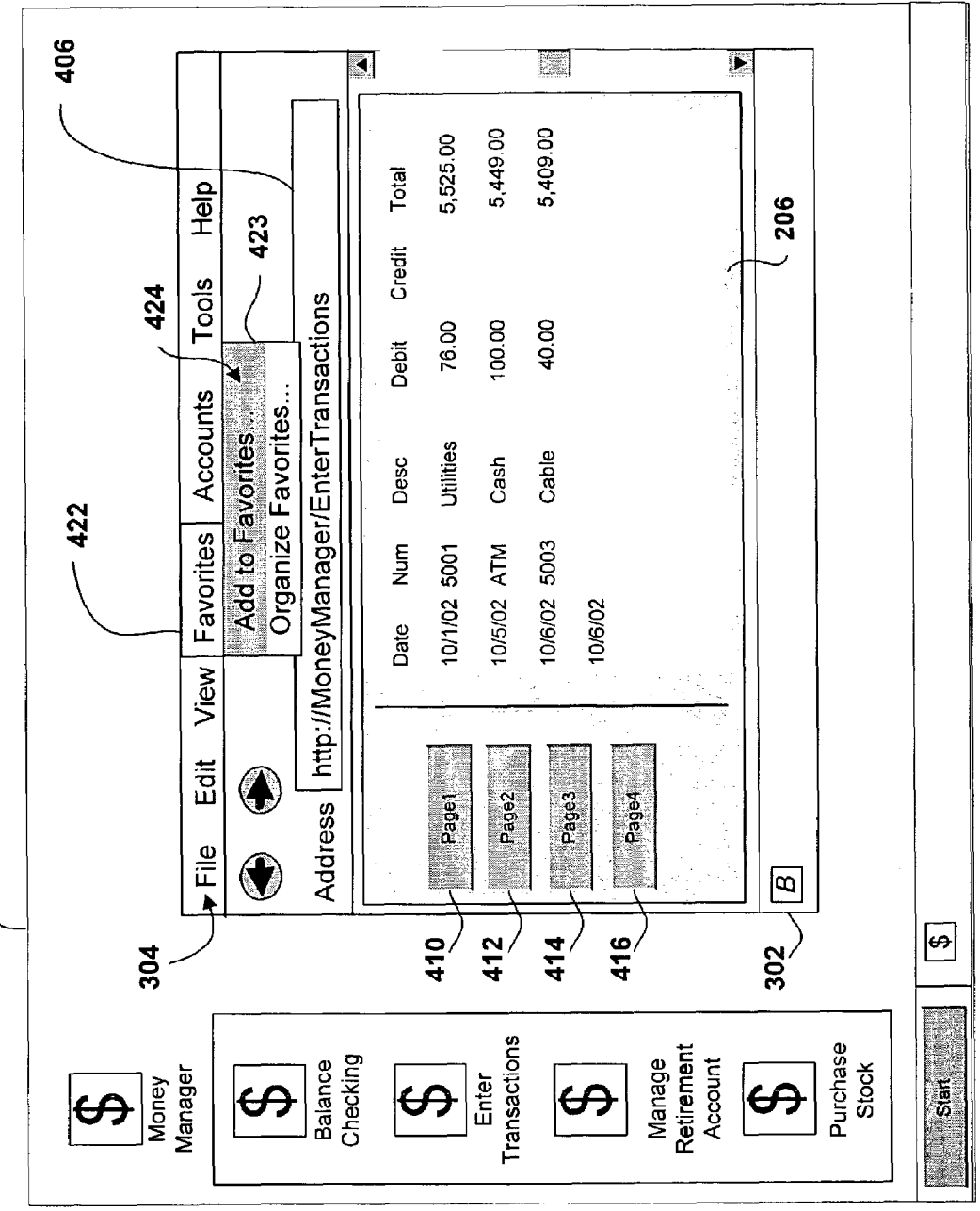

FIG. 4 is a another display that illustrates an exemplary environment in which a browser displays one of the pages associated with the task shown in FIG. 2 and displays the mechanism for favoritizing pages in accordance with the present invention. Display 400 illustrates desktop 301 on which browser window 302 is displaying one of the pages (e.g., page 206) associated with task 210 shown in FIG. 2. As shown, the browser window 302 includes an address field 406. The address field 406 contains a uniform resource locator (URL). For a typical Web page, the contents of the address field 406 contains the URL of the Web page being displayed. In one embodiment of the present invention, the contents of the address field 406 may contain the URL of the task in which the displayed page 206 is included. For this embodiment, the address field 406 contains the URL of the entry point page assigned to task 210. As shown in FIG. 4, the URL of the entry point page is "http://MoneyManager/EnterTransactions". In another embodiment, shown in FIG. 3, the address field 406 may contain the friendly name of the task (e.g., "Enter Transactions"). When a user copies the content of the address field 406, the content is copied as a hyperlink. Thus, when the content is pasted, the friendly name appears, and when the content is clicked upon, the present invention navigates to the hyperlink associated with the friendly name.

The browser window 302 also may include links to various pages, such as links 410-416, that link to pages 202-208 (FIG. 2), respectively.

The browser window 302 may also include a menu bar 304 that lists various menu items, such as a Favorites menu item 422. The Favorites menu item 422 may include a sub-menu 423 that contains one or more sub-menu items, such as Add to Favorites sub-menu item 424. The following discussion will now describe the outcome when the displayed page 206 (i.e., Page3) has been previously associated with a task in accordance with the present invention, and when a user elects to save the displayed page 206 in the browser. In another embodiment, a dedicated sub-menu item (not shown) may be provided for applications to use to favoritize a task.

Before describing the present invention, the manner in which browsers favoritized web pages in the past will first be briefly described below. In the past, when a user selected the Add to Favorites sub-menu item 424, the URL listed in the address field 406 was saved (i.e., "favoritized"). This favoritized web page could then later be selected from a list of favorites. However, because the actual URL of the displayed web page was saved, in some cases, the browser would later be unable to display the web page. For example, this may occur if the web page required a user to login before displaying the web page, or if the page was generated by a server in response to some previous user action. In these situations, the saved URL is not useful and the user must figure out how to get back to the desired web page.

In the browser environment, as shown in FIGS. 2-4 and described above, the present invention provides a mechanism for associating an entry point to each task provided by the navigation-centric application. In this embodiment, the entry point is a task having a URL. Therefore, when the currently displayed page is "favoritized", the uniform resource locator (URL) of the task associated with the favoritized page is saved, rather than the URL of the favoritized page.

Thus, a user may navigate within the application as usual, but when a particular page is favoritized, the URL of the task associated with the particular page is saved. This task, and its default entry page, are designated by developers when creating the application. This mechanism allows developers the ability to control the points at which a user can navigate into the applications or websites that they have designed, and to prevent users from getting a server error when attempting to access a previously favoritized page that is no longer valid in the given context. Thus, in addition to directing the execution of the application to arbitrary code, the mechanism of the present invention enables the favoritization behavior described above. This favoritization behavior greatly enhances a user's experience within the browser.

By default, when a task is navigated to, either from a Favorite or by any other means, the entry page associated with the task is displayed. This entry page is specified by the developer in the declarative description of the task (FIG. 6). When a task is favoritized, the application developer may optionally choose to add metadata to the Favorite along with the URL, containing the current state of the task, including the current page within the task that the user is viewing at the time the task is favoritized. This gives the developer the ability to decide when it is appropriate to return the user to the exact page that they were visiting when they favoritized the task.

Figure 5:
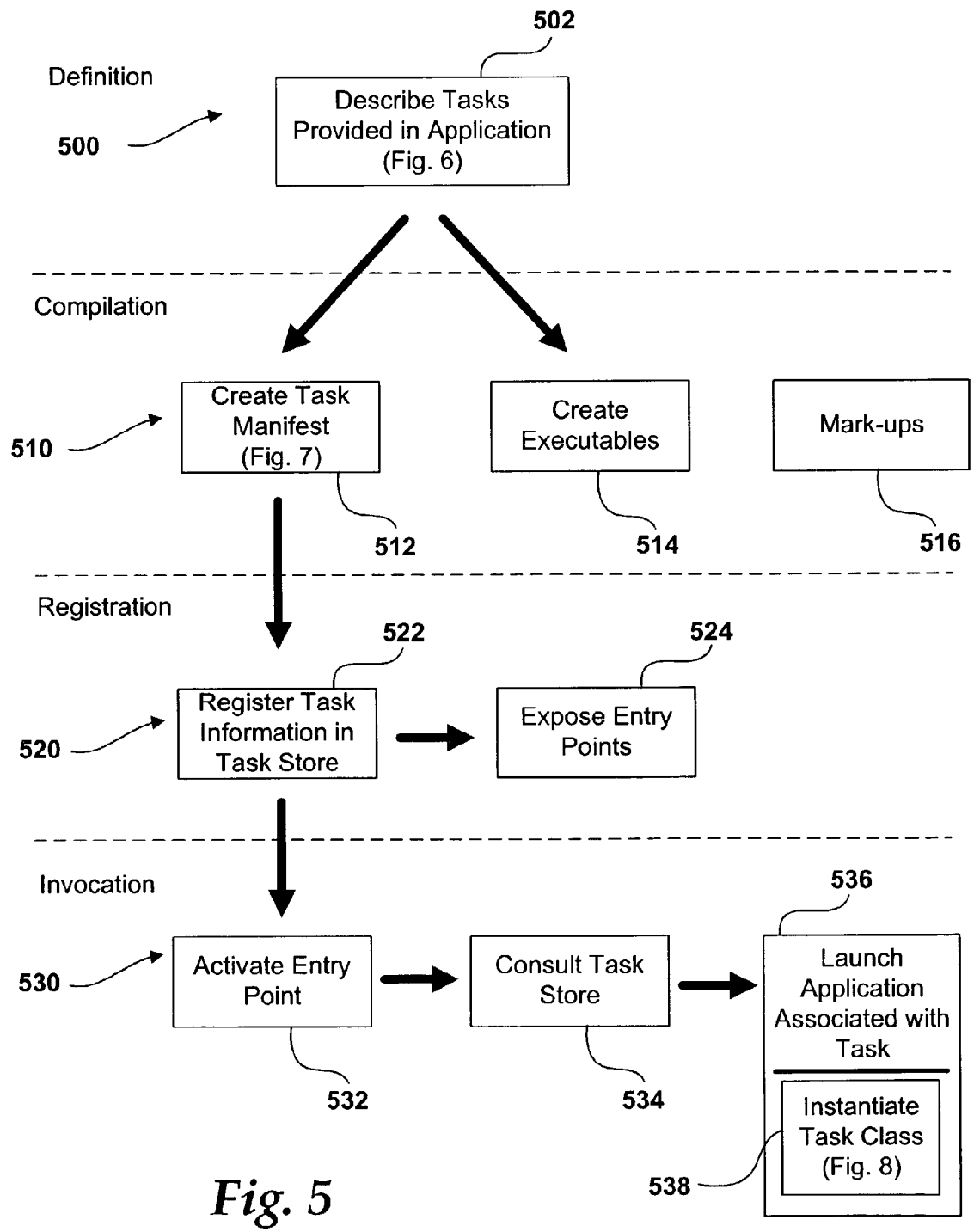
FIG. 5 is a logical flow diagram illustrating processes associated with one embodiment of the present invention.

FIG. 5 is a logical flow diagram illustrating processing associated with the present invention. The various processing includes a definition process 500, a compilation process 510, a registration process 520, and an invocation process 530. The processing shown within FIG. 5 provides a mechanism for easily describing tasks and their associated entry points into an application, and for surfacing these entry points in the operating system shell.

During the definition process 500, at block 502, a developer describes one or more tasks provided by an application. In one embodiment, tasks may be described programmatically through code. In another embodiment, the tasks may be described declaratively within a definition file. The definition file may include only task information or may contain other information related to the application. One format for declaratively describing the tasks, illustrated in FIG. 6 and described in detail below, uses an eXtensible Mark-up Lanaguage (XML)—based format. After the task has been described, the description is compiled during the compilation process 510.

During the compilation process 510, a compiler reads the task descriptions and compiles the description of the task entries into a manifest (e.g., a task manifest) (block 512). In addition, the compilation process compiles the description into executables (block 514). The executables refer to files that are loaded into a processor for processing, such a DLL files and the like. Thus, the executables refers to code that represent the task objects that will become instantiated once the associated task entry point is invoked. The manifest describes the tasks provided by the application in a suitable form that may be conveniently downloaded, if necessary. An exemplary manifest is illustrated in FIG. 7 and will be described in detail later. Once the compilation process 510 has been performed, the task manifest, the executables, and any mark-ups (block 516) may be registered during the registration process 520.

During the registration process 520, the task manifest is read and information obtained from the task manifest is registered in a Task Store (block 522). Thus, the task store contains task information obtained from the task manifest, such as the name of the task, the icon, the tooltip text, file associations, and the task category, which indicates where in the Shell to expose the task (e.g., in a task pane, a Start menu, an activity center, and the like). In one embodiment, the task store includes one or more tables that store the above task information.

The Shell uses the information in the task store to display the UI of tasks that are denoted as exposed entry points. The entry points may be exposed to the user in the form of the task name accompanied by the task icon. Once the entry points have been exposed (block 524), the task is ready to be invoked, which is performed during the invocation process 530.

During the invocation process 530, an exposed entry point associated with a task is invoked (block 532). The task may be invoked by the user through the entry point in the operating system shell or programmatically. The following is exemplary code for invoking a task programmatically:

MoneyManager.EnterTransactions.Start( );.

When the task is invoked through the shell, the icon of the exposed entry point associated with the task is double clicked. In another embodiment, the task may be invoked by selecting a favoritized page from within a favorites menu or by navigating to an URL. These and other methods may be used to invoke a task entry point. Once an entry point is invoked, the task store is consulted (block 534) to determine the application that is associated with the invoked task and to determine the method that should be invoked for the task itself.

In certain situations, the application may not have been previously registered. The application cache may be searched to determine whether or not the application had been previously registered. If a task URL is emailed and then invoked from within the email, the application will not appear as registered when invoked. In these situations, the registration process 520 is performed before the invocation proceeds.

Once the application associated with the invoked task has been registered, the method identified for invoking the task is performed. The invocation process proceeds to block 536 where the application associated with the task is invoked. In one embodiment, tasks are addressed using http protocol such that the exposed entry point references a URL that is the URL of the application, appended with the taskId as declared in the declarative description for the task. This activation may require launching the application unless the application is already running. When the application is launched, a task class associated with the entry point that was activated becomes instantiated (block 538). When the task class becomes instantiated, processing specific to the invoked task class is performed. At block 536, if the application had been running, the process navigates to the currently running instance of the application and then instantiates the task class (block 538).

The application may pass parameters to the task object upon instantiation. For example, in one embodiment parameters may be passed as query strings in the task URL. In another embodiment, tasks can be started by calling StartTask API that takes the task ID and parameters. The parameters may be accessed from the task object's constructor. In another embodiment, a DataObject may be available to pass to the application. The DataObject supports an interface for transferring data, such as parameters. In yet another embodiment, a "delegate" may be accepted as a StartTask parameter. This delegate can then be called to obtain the parameters needed to initialize the task instance.

FIG. 6 illustrates a portion of an exemplary schema of an XML-based format for defining a task in accordance with the present invention. The schema 600 includes a TaskList element 602 and one or more TaskInfo elements (e.g., TaskInfo elements 604, 606, and 608). The TaskList element 602 denotes the start and ending for the descriptions of the list of tasks associated with the application. Each of the TaskInfo elements 604-608 denote the start and ending for the description of one of the specific tasks provided by the application. Each TaskInfo element 604-608 may include several attributes, such as an identifier ("Id"), a uniform resource indicator (URI), a friendly name ("FriendlyName"), a tool tip ("ToolTip"), an icon ("Icon"), a default entry page ("StartPage"), an assembly name ("AssemblyName"), and a class name ("ClassName"). The identifier associates a name for the specific task. The uniform resource indicator associates a location for the specific task. The location may be local or remote. The friendly name associates a name by which the specific task is easily identified. The tool tip associates a helpful suggestion that is displayed to a computer user when the user hovers over the icon. The icon associates a visual entry point to the specific task. The default entry page associates a specific page as the default entry page for the task when launched. The assembly name associates the name of an executable file to the specific task. The class name associates a name to the class for the specific task. The illustrative schema for defining the task list may be included within another file or incorporated with another file in order to completely define the entire application, such as by having a section denoted within the other file for defining a task.

FIG. 7 is one embodiment of a task manifest that is suitable for use in FIG. 5. As such, the task manifest may include task elements (e.g., task elements 704, 706, 708). Each task element is associated with a corresponding entryPoint element (e.g., entryPoint element 712) within an entryPoint list element 710. For example, task element 704 corresponds to entryPoint element 712. Each task element 704 includes information obtained from the task description (FIG. 6). For example, the task elements 704, 706, 708 may include a name for the task, a DisplayName for the task, and an icon associated with the task. In addition, task elements 704, 706, 708 may include an entryPoint attribute (e.g., entryPoint attribute 720). EntryPoint attribute 720 provides a mechanism for conveniently associating a task element with the corresponding entryPoint element. In general, the entryPoint element 712 includes attribute/value pairs pertaining to the invocation of the task. Thus, the entryPoint element 712 includes a URI attribute, an assembly attribute, and a class attribute. The URI attribute identifies a location for the specific task. The assembly attribute identifies the executable to invoke when the task is selected. The class attribute identifies the class to invoke when the entryPoint is invoked.

FIG. 8 is one embodiment of a Task class that is suitable for use in FIG. 5. The Task class 800 is an abstract class that is overridden by the developer when defining a task for a specific unit of functionality provided by an application. The Task class 800 includes a Start method 802 that is invoked when the task object is instantiated. The Start method 802 performs specific processing associated with the task. The developer adds any functionality that occurs when the task is first launched (e.g., restoring state that was persisted when the task was last used). The task class 800 may also include a Finish method 804. The Finish method 804 performs specific operations for "cleaning up" after the task. A developer may use the Finish method 804 to persist the current state of the task so that the Start method 802 may resume from the persisted state at a later time. The present invention may achieve this by sending an endTask notification which will allow "cleaning up" operations, such as saving to a database, releasing resources, and the like. The task class 800 may also include properties, such as a taskId property 806, a URI property, an icon property 808, a friendly name property 808, a tool tip property 810. A developer can add other methods to the overridden Task class to implement any functionality specific to the task. As one skilled in the art will appreciate, the methods and properties provided by the Task class 800 allow the mechanism of the present invention described above to operate. The task object may be created when the task is initiated. In addition, the task ends when a new task begins.

As a further refinement, another class (e.g., a NavigationTask class) may be provided that provides the functionality to easily navigate to the User Interface (UI) when the associated task is invoked. The NavigationTask class may have a property called StartPage 816 that specifies the default entry page for the task. In a NavigationTask, the base Start method navigates to the default entry page ("StartPage"). In addition, the NavigationTask class may provide other general methods related to the navigation of tasks in accordance with the present invention.

In another embodiment, the task class may contain a reference to a UI page or a PageFunction. In the first case, the developer may specify the pages that belong to the task. In the second case, the task may be the entry point to a PageFlow, whose root is the PageFunction referenced by the task. Each of the child PageFunctions of that root PageFunction may be associated with the same task. Such a task may have a DataEntity associated with it, and each page or PageFunction associated with this task may databind their user interface elements to this DataEntity. This allows the task object to persist state when the task object is being requested to shut down.

Thus, as described above, the present invention provides a mechanism for defining multiple entry points into an application. The multiple entry points allow a user to directly access functionality provided by the application. When these multiple entry points are exposed via the operating system, users may more clearly identify the capabilities provided by the installed applications. In addition, help systems and accessibility tools resident on the system may more easily identify the capabilities provided by the installed applications. The present invention allows developers more provided by the installed applications. The present invention allows developers more control over the navigation of their web sites. Therefore, computer users will more likely have a better experience in a browser environment and encounter fewer meaningless links While the above embodiment focuses on applications in a browser environment, those skilled in the art will recognize that the teachings of the present invention may also be implemented with applications in traditional desktop environments and web environments.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for allowing direct access to functionality provided by an application, the method comprises:
  obtaining a description for each task that is provided by an application; wherein each task relates to a unit of functionality provided by the application;
  creating a task manifest using the description for each task; wherein the task manifest describes the tasks provided by the application;
  creating an executable for each of the tasks; wherein the executable refers to code that is instantiated when the associated task entry point is invoked;
  reading the task manifest to obtain task information;
  registering the task information obtained from the task manifest into a task store;
  exposing an entry point for each of the tasks in response to information registered in the task store; wherein the entry point for each of the tasks launches the executable relating to the entry point for the task; and
  when the entry point for one of the tasks is invoked by a direct command to invoke the task that is received independent of a user interface of the application:
    launching the application when the application is not already running in response to a request to the invoke of the entry point; and
    launching the task.

2. The computer-implemented method of claim 1, wherein creating the task manifest comprises compiling the description for each task.

3. The method of claim 2, wherein exposing the entry point includes creating an entry in a menu for each of the tasks, the menu being provided by an operating system shell.

4. The method of claim 2, wherein exposing the entry point includes creating an icon that appears on a computer display within an activity center.

5. The method of claim 2, wherein exposing the entry point includes listing a friendly name in an address field, the friendly name being associated with the entry point.

6. The method of claim 2, wherein exposing the entry point includes having a natural language search engine discover the entry point based on text that is input, the text describes an action to perform.

7. The method of claim 1, further comprising declaratively describing the tasks.

8. The method of claim 7, wherein declaratively describing the tasks is based on an XML format.

9. The method of claim 1, further comprising registering task information associated with the tasks in a task store when installing the application.

10. The method of claim 9, further comprising consulting the task store to determine the application that is associated with the activated entry point.

11. The method of claim 1, wherein the entry point is activated programmatically.

12. The method of claim 1, wherein the entry point is activated through an operating system shell.

13. The method of claim 1, further comprising defining a plurality of pages as the task, and exposing the entry point includes assigning a URL of one of the plurality of pages as the entry point.

14. A computer-readable storage medium having computer executable instructions for directly accessing functionality with an application, the instructions comprising:
in response to selecting an exposed entry point, consulting a task store to determine an application associated with the exposed entry point, the exposed entry point being associated with one out of a plurality of tasks provided by the application; wherein a description is included for each task provided by an application in a task manifest;
wherein each task represents a user- centric activity and wherein a task manifest is created using the description for each task;
wherein the task store is created by reading the task manifest, which includes a description for tasks provided by the application, to obtain task information and registering the task information in the task store launching the application in response to a direct command to invoke a task object associated with the exposed entry point;
wherein the command is received independent of a user interface of the application;
and instantiating the task object associated with the exposed entry point, the task object locating a position within the application from where processing continues under user control to execute instructions associated with the one task.

15. The computer-readable storage medium of claim 14, wherein the exposed entry point includes an icon on a computer display in an activity center.

16. The computer-readable storage medium of claim 14, wherein the exposed entry point includes a menu item.

17. The computer-readable storage medium of claim 14, wherein the exposed entry point includes a friendly name listed in an address field, the friendly name being associated with the entry point.

18. The computer-readable storage medium of claim 14, wherein the exposed entry point includes output generated by a natural language search engine based on text that is input, the text describes an action to perform.

19. The computer-readable storage medium of claim 14, wherein the exposed entry point includes a URL of one of a plurality of pages that are defined for the one task.

20. A computer-readable storage medium encoded with a data structure for declaratively describing a plurality of tasks provided by an application, the data structure comprising:
a first element for identifying a beginning and an ending for defining the plurality of tasks provided by the application;
wherein each task of the plurality of tasks represents a user- centric activity that is configured to be launched independent of the application by a direct command to invoke the task that is received independent of a user interface of the application;
a second element for identifying a beginning and an ending for defining one task out of the plurality of tasks;
a first attribute for providing a location associated with the one task; a second attribute for providing an identifier associated with the one task; and a third attribute for providing a class name associated with the one task; wherein the second element, the first attribute, the second attribute, and the third attribute are used to create a task manifest.

21. The computer-readable storage medium of claim 20, wherein the location include a uniform resource identifier (URI).

22. The computer-readable storage medium of claim 20, wherein the location is remote.

23. The computer-readable storage medium of claim 20, wherein the location is local.

24. The computer-readable storage medium of claim 20, wherein the data structure is XML-based.

25. The computer-readable storage medium of claim 20, further comprising a fourth attribute for providing an icon associated with the one task, the icon providing an exposed entry point into instructions within the application related to the one task.

26. A computer-readable storage medium having instructions encoded thereon for providing multiple entry points into an application, comprising:
creating a task manifest using an XML description for each task; wherein each task represents a user-centric activity;
creating an executable for each of the tasks; wherein the executable refers to code that is instantiated when the associated task entry point is invoked by a direct command to invoke the task that is received independent of a user interface of the application; and reading the task manifest to obtain task information; registering the task information obtained from the task manifest into a task store; exposing an entry point for each of the tasks in response to information registered in the task store; wherein the entry point for each of the tasks launches the executable relating to the entry point for the task when invoked.

27. A system that provided multiple entry points into an application, the system comprising:
a processor; and
a memory, the memory being allocated for a plurality of computer-executable instructions which are loaded into the memory for execution by the processor, the computer-executable instructions performing a method comprising:
creating a task manifest using a description for each task; wherein the task manifest describes the tasks provided by the application; and wherein the task manifest includes a file that is configured to be downloaded;
reading the task manifest to obtain task information;
registering the task information obtained from the task manifest into a task store;
exposing an entry point as a favorite in a browser application for each of the tasks in response to information registered in the task store; wherein the favorite is stored in associated with metadata containing the state of the task;

in response to selecting an exposed entry point using a browser application, consulting the task store to determine an application associated with the exposed entry point, the exposed entry point being associated with one out of a plurality of tasks provided by the application; wherein each task of the plurality of tasks represents a user-centric activity;

launching the application in response to a direct command to invoke a task object associated with the exposed entry point favorite and in response to metadata stored in association with the favorite such that the application continues from its state when the favorite was created; wherein the direct command is received independent of a user interface of the application;

instantiating the task object associated with the exposed entry point, the task object locating a position within the application from where processing continues under user control to execute computer-executable instructions associated with the one task;

displaying a page associated with the task object; and when a page is selected for saving that is not an entry page, saving the entry page as the entry point such that it may be directly navigated to at a later point.

* * * * *